United States Patent [19]
Ishikawa et al.

[11] Patent Number: 5,493,345
[45] Date of Patent: Feb. 20, 1996

[54] METHOD FOR DETECTING A SCENE CHANGE AND IMAGE EDITING APPARATUS

[75] Inventors: Hiroyuki Ishikawa; Hidehiro Matsumoto, both of Tokyo, Japan

[73] Assignee: NEC Corporation, Japan

[21] Appl. No.: 207,953

[22] Filed: Mar. 8, 1994

[30] Foreign Application Priority Data

Mar. 8, 1993 [JP] Japan .................................. 5-046201

[51] Int. Cl.$^6$ .................................................. H04N 7/30
[52] U.S. Cl. ............................................ 348/700; 348/403
[58] Field of Search .................................. 348/700, 701, 348/415, 405, 403, 395, 420

[56] References Cited

U.S. PATENT DOCUMENTS

| | | | |
|---|---|---|---|
| 4,689,672 | 8/1987 | Furukawa et al. | 348/415 |
| 5,032,905 | 7/1991 | Koga | 348/700 |
| 5,099,322 | 3/1992 | Gove | 348/700 |
| 5,347,310 | 9/1994 | Yamada et al. | 348/405 |

FOREIGN PATENT DOCUMENTS 2-268370  11/1990  Japan .
3-29355   4/1991   Japan .

*Primary Examiner*—Howard W. Britton
*Assistant Examiner*—A. Au
*Attorney, Agent, or Firm*—Ostrolenk, Faber, Gerb & Soffen

[57] ABSTRACT

A method for detecting a scene change in an input image data composed of a plurality of frames. First, a DC component for each of blocks into which each of the frames is divided is calculated by orthogonal transformation such as discrete cosine transformation. An absolute value of the difference between the DC component of a current frame and the DC component of a frame adjacent to the current frame is calculated for each block of the current frame. The number of blocks for which the absolute value exceeds a first threshold value Is then counted, and a scene change between tile current frame and the adjacent frame is detected when the number of the blocks is higher than a second threshold value.

12 Claims, 3 Drawing Sheets

METHOD FOR DETECTING A SCENE CHANGE AND IMAGE EDITING APPARATUS

BACKGROUND OF THE INVENTION

1. Field of the Invention

This invention relates to an image editing apparatus, and more particularly to a method of automatically detecting a change or shift between different scenes of an image and an image editing apparatus which makes use of the method.

2. Description of tile Related Art

When an editing operation is performed for image information such as a video image, the editing operation is performed in most cases for each scene or shot of the video information. Also, when engaged in connecting a plurality of scenes to make up a single work, connection of the scenes is carried out after first deleting unnecessary portions, editing the image, processing the image, adding special effects and performing other necessary operations for each of the scenes.

In a movie or cinema, editing operations such as those mentioned above have been performed by coloring a film frame by frame or patching, that is, cutting and connecting, a film after photographing. Where image information is stored on a video tape, a video disk, a hard disk or a similar recording medium, the physical recording medium itself is not made a subject for editing, but rather, editing operations are performed for an image signal read out from the recording medium. As the image signal, a signal that has been processed by image compression processing is frequently used.

In order to perform an editing operation for an image signal, since an editing operation is performed in most cases for each scene, it is necessary to detect and record information regarding a starting time and an ending time of each scene in advance. Conventionally, an image is displayed using a frame feeding function of an image reproducing apparatus, and starting and ending Limes of each scene are manually written down one by one making use of time information incidental to input source data. This method, however, requires considerable labor and time for detection of a change or shift between scenes, resulting in a reduction of operation efficiency in editing operations.

An image editing apparatus is disclosed in Japanese Patent Laid-Open Application No. 268370/1990 (JP, A, 2-268370) by Katayama et al. wherein, using image data coded so as to allow progressive display as subject data, original image data are automatically edited in accordance with an editing procedure in which editing has been performed for low resolution data of this image data. With the apparatus, since a retrieving or editing operation by a human operator is performed for low resolution data, the time required for retrieval or transmission can be reduced. However, retrieval itself is still performed manually and considerable time is required for detection of a change-over between scenes. Japanese Patent Publication Application No. 29355/1991 (JP, B2, 3-29355) by Yuasa et al. discloses a method wherein a plurality of known image data are registered as reference image data in advance and object image data for comparison is compared with the reference image data to detect a scene change. With this method, however, since It is necessary to first register the reference image data, the reference image data must be prepared for each scene for which it is desired to perform retrieval. Consequently, the method cannot be applied to unknown image data.

SUMMARY OF THE INVENTION

It is an object of the present invention to provide a method by which a scene change of unknown image information is detected automatically and with certainty.

It is another object of the present invention to provide an image editing apparatus which can automatically detect a scene change of unknown image information with certainty.

The first-mentioned object of the present invention described above is achieved by a method for detecting a scene change comprising the steps of detecting a direct current component value of a spatial frequency distribution for each of a plurality of blocks into which an input image is divided, and detecting a scene change in the input image in accordance with the amount of variation of the direct current component value between frames of the input image.

The object of the present invention is achieved also by a method for detecting a scene change of an input image composed of a plurality of frames, comprising the steps of finding a direct current component value by orthogonal transformation for each of a plurality of blocks into which each of the frames is divided, calculating an absolute value of a difference between the direct current component value of a current frame and the direct current component value of an adjacent frame to the current frame for each of the blocks of the current frame, and counting the number of blocks for which the absolute value exceeds a first threshold value and discriminating, when the number of the blocks is higher than a second threshold value, that there is a scene change between the current frame and the adjacent frame.

The second-mentioned object of tile present invention is achieved by an image editing apparatus for editing an input image composed of a plurality of frames, comprising orthogonal transformation means for applying orthogonal transformation to each of a plurality of blocks into which each of the frames is divided, direct current component extracting means for extracting a direct current component value by the orthogonal transformation, first storage means provided for a first frame for storing the direct current component values of the blocks of the first frame, second storage means provided for a second frame for storing the direct current component values of the blocks of the second frame, switch means for selectively inputting the direct current component values to the first storage means or the second storage means for each of the frames, difference extracting means for referring to the first and second storage means to calculate absolute values of differences between the direct current component values of corresponding blocks of the first and second frames, and discriminating means for discriminating tile presence or absence of a scene change in the input image based on the absolute values.

The principle of detection of a change or shift between scenes according to the present invention is described below. A change-over of a scene, that is, the fact that the scene has been changed over to an image having no relation to the last image, is detected based on a variation of a DC (direct current) component value in a spatial frequency distribution of the image for each frame. The spatial frequency distribution of the image makes an index to a characteristic of the image, and when the scene is changed over, it is considered that the spatial frequency distribution of the image varies suddenly. When a spatial frequency distribution of an image is found, the DC and low-frequency AC (alternating current)

components generally have dominant values. Therefore, according to the present invention, discrimination is efficiently performed by discriminating a change-over between scenes based on a DC component of a spatial frequency distribution.

In the present invention, preferably a DC component value of a spatial frequency distribution is detected for each of a plurality of blocks Into which an image of a screen is divided. This is because a very large amount of calculation is required to calculate a spatial frequency distribution for the subject of one entire screen and sometimes the DC component value may possibly exhibit little variation even when there is a variation between scenes. In particular, the amount of variation of a DC component value between a current frame and the last frame is calculated for each block, and it is then examined whether the amount of variation for each block exceeds a first threshold value, whereafter discrimination of presence or absence of a variation between scenes is performed based on whether the number of blocks in which the amount of variation exceeds a first threshold value is higher than a second threshold value.

The method of calculation of a spatial frequency distribution may be based on orthogonal transformation such as, for example, discrete Fourier transformation (DFT) or discrete cosine transformation (DCT). Above all, discrete cosine transformation can be used preferably in the present invention since it is commonly used as an image coding algorithm and it involves a comparatively small amount of calculation. In particular, if detection of a change between scenes is performed based on a result of a discrete cosine transformation algorithm, the hardware for coding an image can be used as the hardware for detecting a scene change, and besides, detection of a scene change can be performed between coding cycles.

The above and other objects, features and advantages of the present invention will become apparent from the following description referring to tile accompanying drawings which illustrate an example of a preferred embodiment of the present invention.

DESCRIPTION OF THE PREFERRED EMBODIMENT

Figure 1:
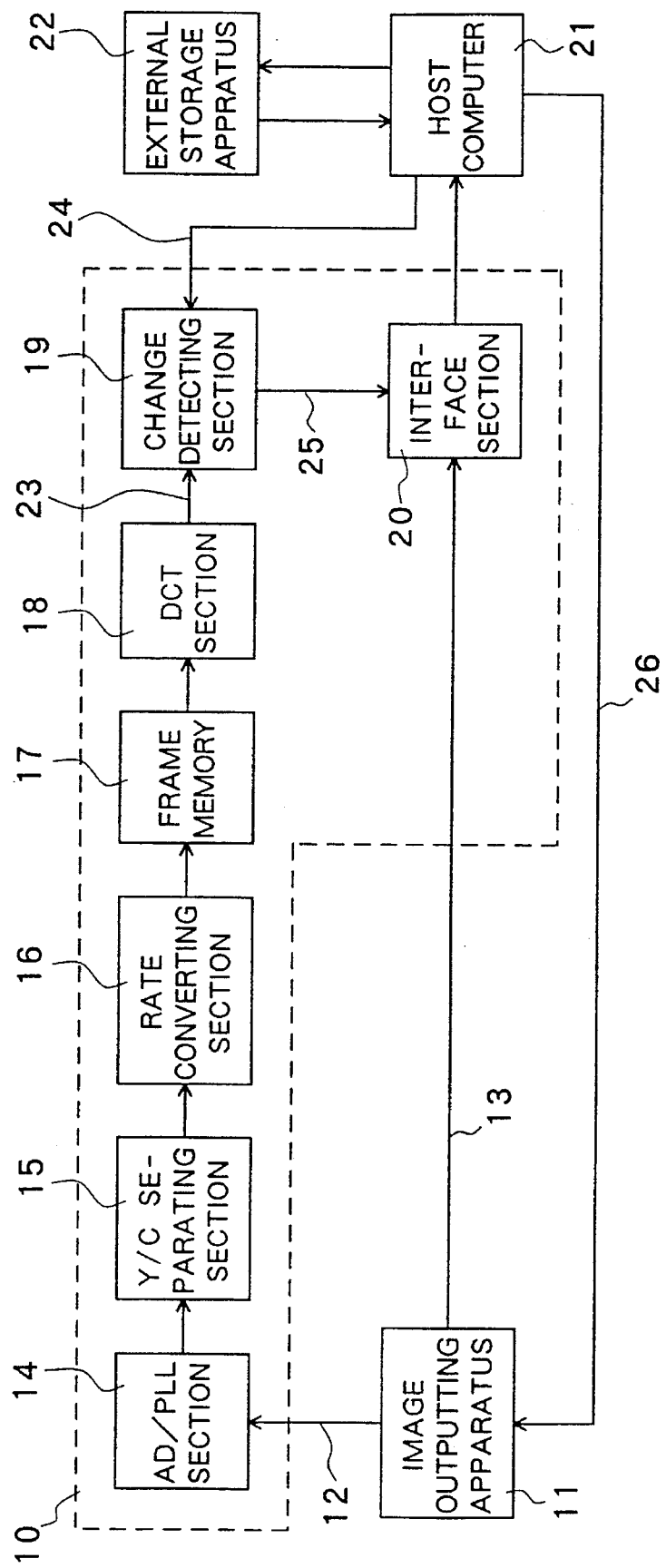
FIG. 1 is a block diagram showing the construction of an image editing apparatus of an embodiment of the present invention.

An embodiment of the present invention is described below with reference to the drawings. A scene change detecting apparatus 10 shown in FIG. 1 detects a changeover between scenes of an image signal from an image outputting apparatus 11. In the present embodiment, the image outputting apparatus 11 is constituted from a video tape recorder, a video disk reproducing apparatus or a like apparatus and is controlled by an image outputting apparatus control signal 26 from a host computer 21, which will be hereinafter described, to output an NTSC composite signal 12 as an image signal and a time code signal 13. The time code signal 13 is synchronized with the NTSC composite signal 12 and represents an elapsed time from a top image to an image which is being outputted at present.

The scene change detecting apparatus 10 includes an AD/PLL section 14 for converting the NTSC composite signal 13 into a digital signal, a Y/C separating section 15 for dividing an output signal of the AD/PLL section 14 into a brightness signal and a color difference signal, a rate converting section 16 for converting the rate of a signal from the Y/C separating section 15, a frame memory 17 for storing a signal after the rate conversion as image information for one screen, a DCT section 18 for performing discrete cosine transformation for the image information stored in the frame memory 17 for each block to produce coded image data 23, a change detecting section 19 for detecting a change between scenes from the coded image data 23 from the DCT section 18, and an interface section 20 for receiving a change discrimination result signal 25 from the change detecting section 19 and the time code signal 13 from the video outputting apparatus 11 and serving as an interface to the host computer 21 on the outside of the detecting apparatus 10. The AD/PLL circuit 14 includes an analog to digital converting circuit, and a PLL (Phase Locked Loop) circuit for establishing synchronization in phase. The rate converting section 16 is provided to thin out color difference components which do not cause deterioration of the picture quality that is significantly noticeable to the eye due to the characteristics of human eyesight in order to assure high compression efficiency of data. The interface section 20 includes an output buffer and is constructed so that, when a change or shift between scenes is detected, it outputs a time code signal to the host computer 21.

The DCT section 18 divides one screen into a plurality of rectangular blocks and executes discrete cosine transformation for image Information for each block to detect a DC (direct current) coefficient and AC (alternating current) coefficients of the block. When discrete cosine transformation is performed for an image, most components of the image information are transformed into the DC coefficient or AC coefficients at low frequency portions. In short, since a DC coefficient obtained by discrete cosine transformation most significantly represents the characteristic of pixels in the block, the average magnitude of energy of the pixels of the block can be determined from the value of the DC coefficient. The DC coefficient and AC coefficients thus calculated are outputted as coded image data 23 from the DCT section 18.

Figure 2:
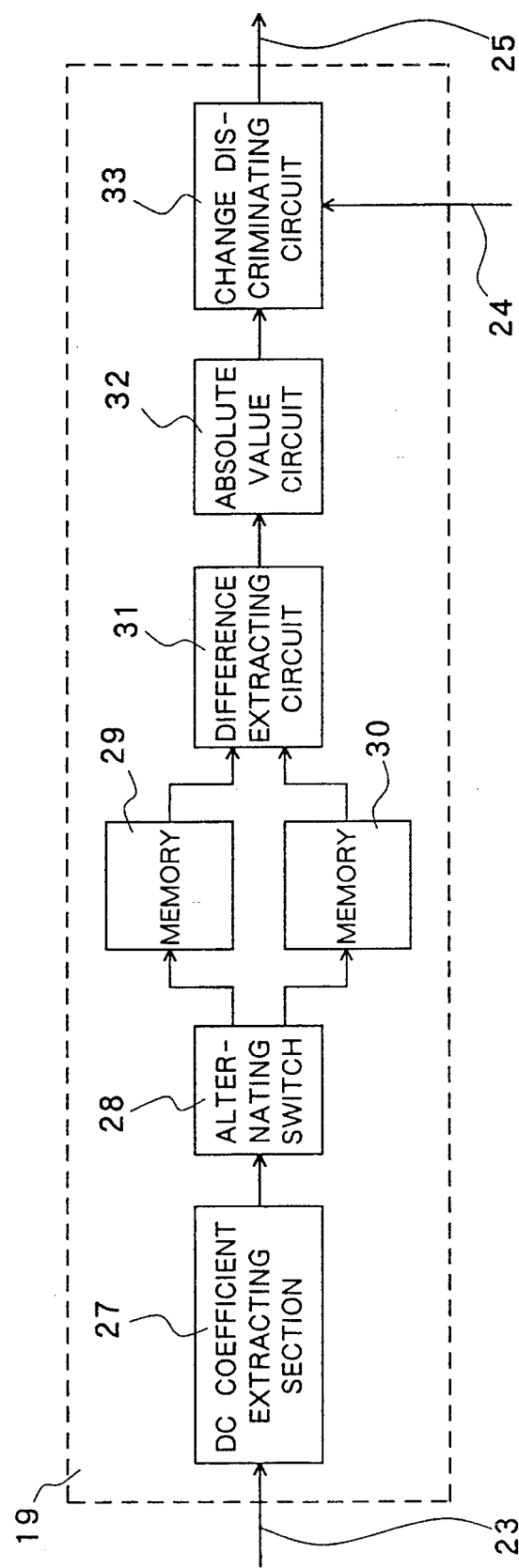
FIG. 2 is a block diagram showing an example of a construction of a variation detecting section of the apparatus of FIG. 1.

Next, an example of a construction of the change detecting section 19 is described with reference to FIG. 2. The change detecting section 19 includes a DC coefficient extracting section 27 for receiving the coded image data 23 from the DCT section 18 and extracting a DC coefficient from the coded image data 23, a pair of memories 29 and 30, one for storing a DC coefficient for each block of an image of one frame, and the other for storing a DC coefficient for each block of an image of a next frame, an alternating switch 28 for storing the thus-extracted DC coefficient alternately into the memory 29 or 30 for each succeeding frame, a difference extracting circuit 31 for reading out values of a DC coefficient of corresponding blocks from both of the memories 29 and 30 and extracting the difference between the values, an absolute value circuit 32 for calculating an absolute value of the difference value extracted by the difference extracting circuit 31 in order to facilitate comparison, and a change discriminating section 33 for discriminating based on the thus-calculated absolute value whether or not a change between scenes has occurred. The change discriminating section 33 performs discrimination using first and second threshold values A and B and outputs a result of the discrimination as a change discrimination result signal 25. More particularly, the change discriminating section 33 counts the number of blocks for which the absolute value of the difference value is higher than the first threshold value A as a result of comparison of the DC coefficients for the blocks, and discriminates a change or shift between scenes when the thus-counted number is higher than the second threshold value B. The first and second threshold values A and B are set based on a threshold value control signal 24 from the host computer 21.

An external storage apparatus 22 is connected to the host computer 21. The host computer 21 controls operation of the image outputting apparatus 11 using the image outputting apparatus control signal 26 and causes the first and second threshold values A and B to be set adaptively using the threshold value control signal 24. Further, when a change between scenes is detected and a time code signal at the point of time of the scene change is received from the interface section 20, the host computer 21 stores the time code into the external storage apparatus 22.

The principle of detection of a scene change in the present embodiment will next be described.

Figure 3:
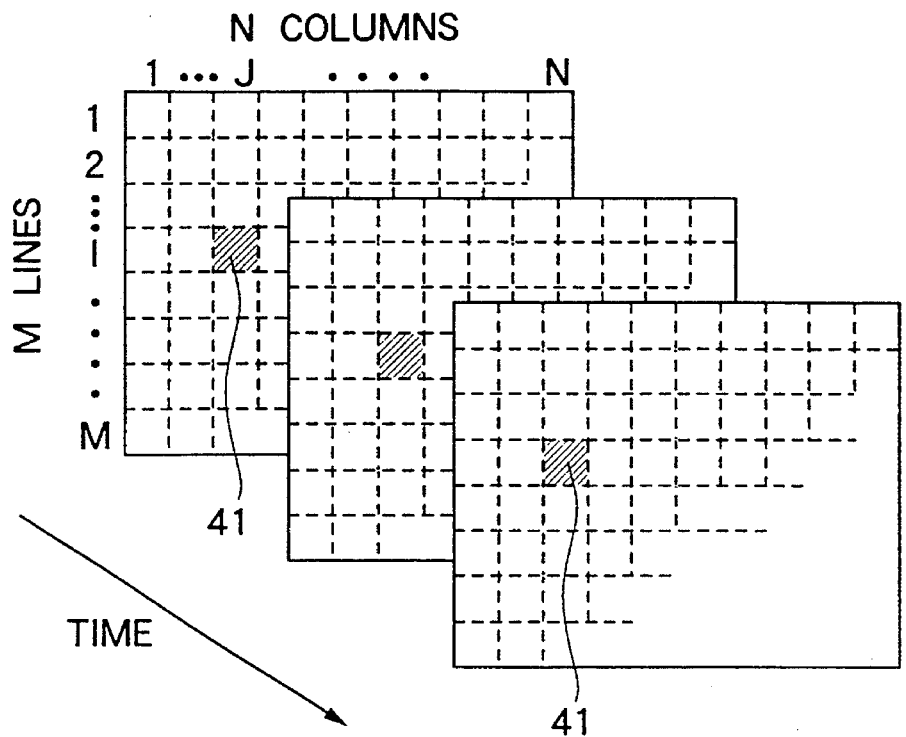
FIGS. 3 and 4 are diagrammatic views illustrating the principle of a method of detecting a scene change.
Figure 4:
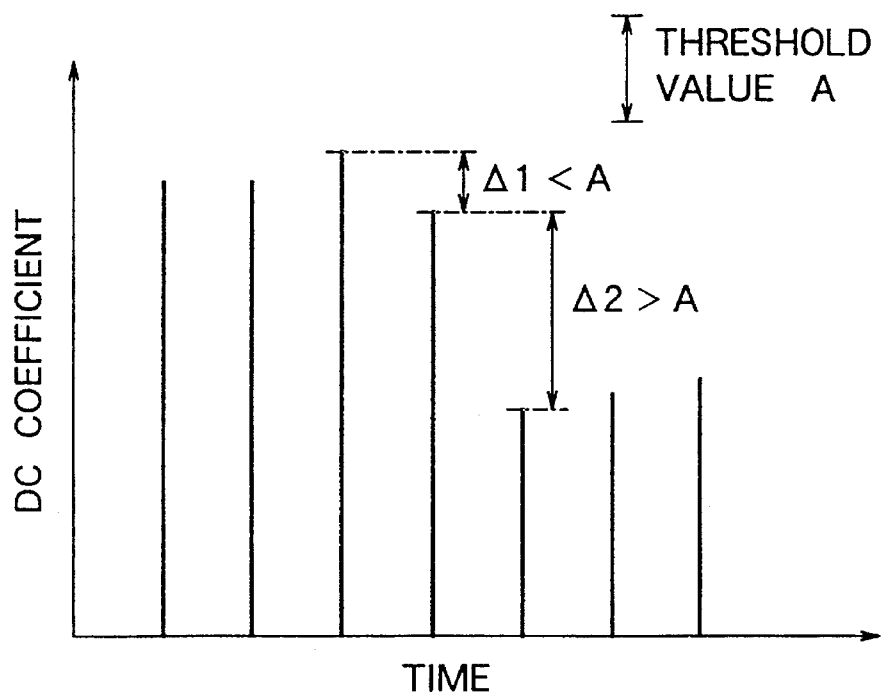

As shown in FIG. 3, each screen, i.e., each frame, is divided into m×n blocks, and discrete cosine transformation is performed for each block for each frame. Here, it is assumed that the block on the i-th line and j-th column is selected as an aimed block 41 and the DC coefficients of the aimed blocks 41 exhibit a variation such as in FIG. 4 among successive frames which appear successively with respect to time. In FIG. 4, the axis of the abscissa represents time, and the axis of the ordinate represents the DC coefficient of the aimed block 41. Since it is considered that, when a change-over between scenes occurs, the DC coefficient of each block exhibits a sudden variation, presence or absence of occurrence of a change-over between scenes can be discriminated by comparing the value of the difference in the DC coefficient between two successive frames with a threshold value. In the example shown in FIG. 4, the difference value Δ1 is lower than the first threshold value A, and accordingly, it can be presumed that no change-over between scenes has occurred. On the other hand, since the difference value Δ2 is higher than the first threshold value A, it can be presumed that a change-over between scenes has occurred. However, since the DC coefficient in a single block sometimes varies suddenly as a result of the movement of a physical body in the same screen or exhibits little variation even after a change-over between scenes occurs, final discrimination based only on the variation of the DC coefficient of a single block may possibly result in a discrimination error. Therefore, in the present embodiment, the number of blocks which exhibit a difference value higher than the first threshold value A is detected for the entire screen, and when the number is higher than the second threshold value B, it is discriminated finally that a change-over between scenes has occurred, and in this way, a scene change can be detected with certainty. The final result of the discrimination is outputted as a change discrimination result signal 25.

The operation for detecting a scene change in the present embodiment will next be described.

The NTSC composite signal 12 and the time code signal 13 are sent out from the image outputting apparatus 11. The NTSC composite signal 12 is converted into a digital signal by the AD/PLL section 14 and then stored as Image information for one screen into the frame memory 17 by way of the Y/C separating section 15 and the rate converting section 16. The DCT section 18 then reads out the image information for each block of the screen from the frame memory 17 and successively performs discrete cosine transformation. Discrete cosine transform coefficients obtained as a result of the discrete cosine transformation are inputted as the coded image data 23 for each block into the change detecting section 19.

In the change detecting section 19, the DC coefficient extracting section 27 extracts only a DC component as a DC coefficient value from the coded image data 23. The DC coefficient value is stored into the memory 29 by way of the alternating switch 28. After DC coefficient values of the blocks of one frame are stored into the memory 29, the alternating switch 28 is changed over so that DC coefficients of blocks of a next frame are thereafter stored into the other memory 30. Thereafter, the memory changing over switch 28 is changed over for each frame in a similar manner so that DC coefficient values of a current frame are stored in one of the memories 29 and 30 while DC coefficient values of the last frame are stored in the other of the memories 29 and 30.

The difference extracting circuit 31 refers to both of the memories 29 and 30 to calculate differences between the DC coefficient values at corresponding blocks of the current frame and the last frame. The difference values of the blocks are inputted to the change discriminating circuit 33 by way of the absolute value circuit 32. The change discriminating circuit 33 discriminates whether the inputted difference values for all of the blocks of the current frame exceed the first threshold value A, and determines, when the number of those blocks whose difference values exceed the first threshold value A is higher than the second threshold value B, that a change-over of a scene has occurred between the last frame and the current frame.

When it is determined that a scene change has occurred, the change discrimination result signal 25 is inputted to the interface section 20, and consequently, a time code at present is outputted from the interface section 20. The host computer 21 receives the time code and stores it into the external storage apparatus 22. By repeating the sequence of operations described above, it is examined for the entire image data outputted from the image outputting apparatus 11 whether or not a scene change has occurred between adjacent frames, and a time code corresponding to the location of each scene change is stored into the external storage apparatus 22. Naturally, image position information may be outputted in place of a time code from the Image outputting apparatus 11 so that it may be recorded into the external storage apparatus 22. Here, the Image position Information is an index representative of the position of the frame in the image outputting apparatus 11, and for example, where the image source is a video tape, the image position information indicates the length of the video tape from the beginning of the tape, but where the image source is a video disk, the image position Information indicates the position of a track.

If a time code is stored into the external storage apparatus 22 after an identifier such as a file name of inputted image data is added to the time code, it is possible to detect a scene change for each of a plurality of input image data. Meanwhile, since index information to a location of a scene change is stored in tile external storage apparatus 22 for image data for which detection of a scene change has been performed with tile apparatus of the present embodiment, it is possible to control, upon image editing, the image outputting apparatus 11 in accordance with the image outputting apparatus control signal 26 from the host computer 21 to perform editing within the same scene, scene skipping or a like operation.

While it is possible to keep the first and second threshold values A and B fixed to individually predetermined values, in the present embodiment, they are set adaptively in accordance with the threshold value control signal 24 from tile host computer 21. In particular, in the event of an operation error in which it is determined that a scene change has occurred although no scene change has actually taken place, the operation error can be canceled by adaptively varying the values of the threshold values A and B by the host computer 21.

In the present embodiment, since a scene change is detected from DC coefficient values obtained by discrete cosine transformation, the present method can be harmonized well with data compression of an image. In particular, where data are compressed by discrete cosine transformation, it is easy to readily detect from the compressed data tile presence or absence of a scene change as well as the location of a scene change if a scene change is present. Further, by controlling tile image outputting apparatus by means of the host computer using a recorded time code, an automatic image compressing operation within a same scene is allowed.

If tile present embodiment is applied to decompression (decoding) of an image compressed by discrete cosine transformation, the location of a scene change can be recorded simultaneously with the decompression or decoding. Accordingly, it is possible to perform automatic pause for each scene, scene skipping or scene repetition, and by instructing the host computer in advance so as to execute such a sequence of operations as described above, the operations can be executed automatically.

It is to be understood that variations and modifications of a method for detecting scene change and an image editing apparatus disclosed herein will be evident to those skilled in the art. It is intended that all such variations and modifications be included within the scope of the appended claims.

What is claimed is:

1. A method for detecting a scene change of an input image composed of a plurality of frames, comprising steps of:

determining a direct current component value by orthogonal transformation for each of a plurality of blocks into which each current frame is divided:

calculating an absolute value of a difference between the direct current component value of a current frame and the direct current component value of a frame adjacent to the current frame for each of the blocks of the frames; and counting the number of blocks by which the absolute value of a block exceeds a first threshold value, and determining that there is a scene change between the current frame and the adjacent frame when the counted numbers of blocks exceeds a second threshold value.

2. The method for detecting a scene change as claimed in claim 1, wherein the plurality of frames are inputted in a time series.

3. The method for detecting a scene change as claimed in claim 2, wherein the adjacent frame is a frame that precedes or succeeds the current frame.

4. The method for detecting a scene change as claimed in claim 1, wherein the orthogonal transformation is discrete cosine transformation.

5. The method for detecting a scene change as claimed in claim 3, wherein the orthogonal transformation is discrete cosine transformation.

6. The method for detecting a scene change as claimed in claim 5, wherein each of the blocks is a rectangular region in the frame.

7. The method for detecting a scene change as claimed in claim 5, wherein when the input image is determined to be a scene change, time information or image position information of the input image is stored.

8. An image editing apparatus for editing an input image composed of a plurality of frames, comprising:

orthogonal transformation means applying orthogonal transformation to each of a plurality of blocks into which each of the frames is divided:

direct current component extracting means extracting a direct current component value by the orthogonal transformation;

first storage means providing a first frame for storing the direct current component values of the blocks of the first frame;

second storage means providing a second frame for storing the direct current component values of the blocks of the second frame;

switch means selectively inputting the direct current component values from the direct current component extracting means to said first storage means or said second storage means for each of the frames;

difference extracting means referring to said first and second storage means to calculate absolute values of difference between the direct current component values of corresponding blocks of the first and second frames; and discriminating means discriminating presence or absence of a scene change in the input image based on the absolute values, said discriminating means counts the number of blocks for which the absolute value exceeds a first threshold value and determines, when the number is higher than a second threshold value, that there is a scene change between the first and the second frames.

9. The image editing apparatus as claimed in claim 8, wherein the plurality of frames are inputted in a time series.

10. The image editing apparatus as claimed in claim 9, wherein tile orthogonal transformation is discrete cosine transformation.

11. The image editing apparatus as claimed in claim 10, further comprising external storage means for storing time information or position information of the input image at a point at which it is discriminated that there is a scene change.

12. The image editing apparatus as claimed in claim 11, further comprising control means for controlling read-out of an image outputting apparatus in response to the time information or the position information.

* * * * *